J. McARDLE.
Sod-Cutter.

No. 161,048.    Patented March 23, 1875.

Witnesses.
J.C. Whitney
J.S. Rancwyph

Inventor
James McArdle

UNITED STATES PATENT OFFICE.

JAMES McARDLE, OF WINONA, MINNESOTA, ASSIGNOR OF ONE-HALF HIS RIGHT TO ALVIN C. HAMILTON, OF SAME PLACE.

IMPROVEMENT IN SOD-CUTTERS.

Specification forming part of Letters Patent No. 161,048, dated March 23, 1875; application filed June 18, 1874.

*To all whom it may concern:*

Be it known that I, JAMES MCARDLE, of the city and county of Winona and State of Minnesota, have invented a new and Improved Sod-Cutter, of which the following is a specification:

My invention relates to the construction of a new and useful implement for cutting turf or live sod with ease, certainty, and economy in time, cost, and labor, and without injury to the structure of the sod.

It consists of a bed-frame with suitable handles and draft attachment, combined with which are cutters, guide-plates, and friction-rollers.

Figure 1:
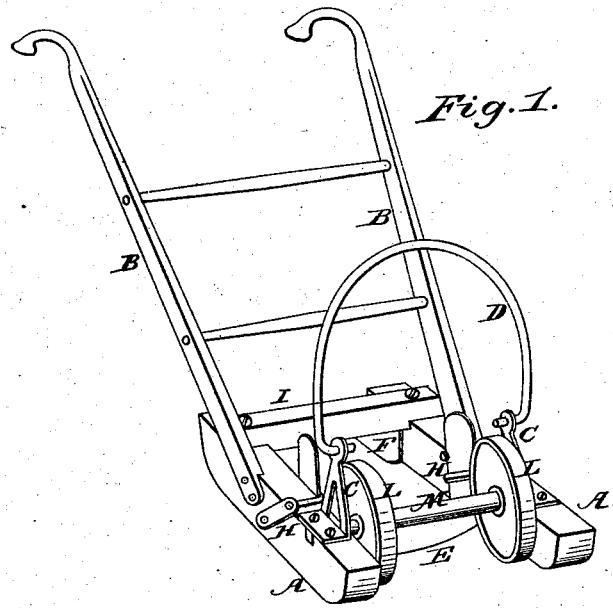
Figure 2:
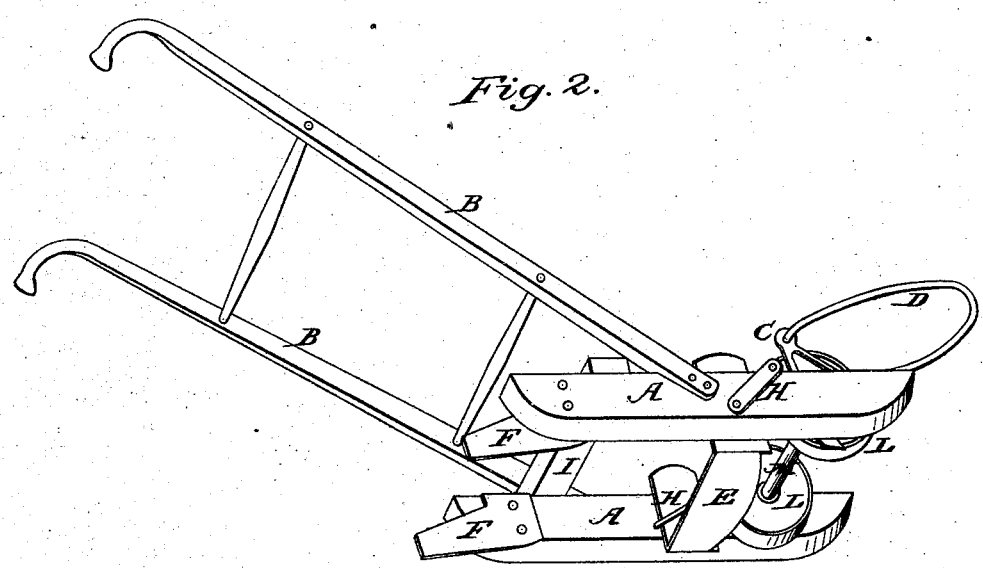

Figure 1 is a nearly front perspective view of my invention. Fig. 2 is a perspective view of the same tilted up.

A A are the sides or runners of the bed-frame, and may be made of two by four inch hard wood, or other suitable material, about three feet long, chamfered from below to the the arc of a circle in front. The cross-bar I and the iron rod M are bolted to the runners, holding them firmly in place at the proper distance apart for desired width of cut of sod-slice, a convenient width being about sixteen inches. Bolted to the bed-frame are the handles B B, with which the machine is managed. D is a draft-handle for man-power, hooking into the draft-brackets c c. These draft-brackets are bolted to the runners, and project a sufficient distance above them to cause the point of draft to assist in holding the machine to the required depth of cut.

The cutter E is made of steel plate about four inches in width. It spans horizontally the space between the runners A A. The ends are bent up at right angles between and in contact with the inside of the runners, and project a few inches above them, and are confined to the runners with clamps and bolts in the usual manner of such fastenings. By means of these clamps H H the cutter-plate E is readily adjusted to such depth of cut horizontally as may be desired for thickness of sod. The horizontal section of the cutter-plate is ground with the bevel upon the upper side to give a slight draft downward. It is also ground to the form of an arc of circle, from the front center backward to the side angles, and about one inch back from the front edge of the perpendicular sections. This form of grinding the cutter has a twofold object; first, to cut the sod-slice with less power; and second, to part the edges of the sod-slice a little in advance of the horizontal cut, thereby insuring clean-cut edges to the sod-slice.

Independent colters may be attached to the inside of the runners forward of the cutter, if preferred, but the above-described form of the cutter E renders them unnecessary. F F are plates attached to the inside of the heels of the runners, projecting slightly below them. They take hold of the ground, and serve as guides to sustain the machine in a right line, when in use. L L are friction-rollers running upon the rod M inside the runners, and are of such diameter as to project slightly below them. They serve to lessen ground friction, and as, from their position, they will run constantly upon the unbroken turf, they serve as adjusters to depth and uniformity of cut in the case of a removal of one sod-slice before the next slice is cut, which, in the absence of the friction-rollers, would permit the runner on that side to run in the bottom of the furrow, causing a cut of unequal thickness.

Where much work is to be done, the draft-handle D is unhooked, and a cross-bar, with whiffletree attached, may be inserted in its place, and horse-power used.

I make no claim to the guide-plates A A, the handles B B, the draft-brackets c c, the friction-rollers L L, nor to an angular cutter simply, separately considered.

What I claim as my invention, and desire to secure by Letters Patent, is—

1. In a sod-cutter, the angular blade E, having perpendicular cutting portions, and a horizontal curved receding blade, substantially as shown and described.

2. The combination in a sod-cutter, of the angular blade E, guide-plates F F, friction-rollers L L, and runner-frame A, substantially as specified.

JAMES McARDLE.

Witnesses:
I. C. WHITNEY,
J. S. RANDOLPH.